United States Patent [19]

Blanc et al.

[11] Patent Number: 5,022,600

[45] Date of Patent: Jun. 11, 1991

[54] WINDER-UNWINDER FOR OPTICAL FIBRE CABLES

[75] Inventors: Floréal Blanc, Verrieres le Buisson; Jacques Lordet, Des Fosses, both of France

[73] Assignee: Commissariat A L'Energie Atomique, Paris, France

[21] Appl. No.: 569,519

[22] Filed: Aug. 20, 1990

Related U.S. Application Data

[63] Continuation of Ser. No. 352,855, May 16, 1989, abandoned.

[30] Foreign Application Priority Data

May 16, 1988 [FR] France ................. 88 06534

[51] Int. Cl.$^5$ ............................................. B65H 75/48
[52] U.S. Cl. ............................... 242/107.1; 191/12.2 R
[58] Field of Search .............. 242/107, 107.1, 107.11, 242/107.12, 107.13, 107.14, 107.15, 86.5 R, 86.51, 54 R; 191/12.2 R, 12.2 A, 12.4

[56] References Cited

U.S. PATENT DOCUMENTS

| | | | |
|---|---|---|---|
| 1,446,410 | 2/1923 | Bennett et al. | 242/107.1 |
| 1,868,409 | 7/1932 | Crispen | 242/107.1 |
| 2,438,515 | 3/1948 | Mohler | 242/107.1 X |
| 2,518,071 | 8/1950 | Rushworth | 242/107.1 |
| 3,061,234 | 10/1962 | Morey | 242/107.1 |
| 3,144,218 | 8/1964 | Tepe | 242/107.1 |
| 3,409,246 | 11/1968 | De Pas | 242/107 |
| 3,705,962 | 12/1972 | Banister | 242/107 |
| 4,010,913 | 3/1977 | Guerster et al. | 242/107 |
| 4,657,140 | 4/1987 | Zagar et al. | 206/397 |
| 4,657,165 | 4/1987 | Giroux | 226/183 |
| 4,661,660 | 4/1987 | von Sothen et al. | 242/54 R X |

FOREIGN PATENT DOCUMENTS

| | | | |
|---|---|---|---|
| 0216582 | 4/1987 | European Pat. Off. | |
| 2810023 | 3/1978 | Fed. Rep. of Germany | |
| 7936831 | 7/1980 | Fed. Rep. of Germany | |
| 8633663 | 4/1987 | Fed. Rep. of Germany | |
| 8801683 | 5/1988 | Fed. Rep. of Germany | |
| 1590160 | 5/1981 | United Kingdom | 242/107 |

Primary Examiner—John M. Jillions
Attorney, Agent, or Firm—Michael N. Meller

[57] ABSTRACT

It comprises a support (2), a drum (8) having a winding zone for an optical cable (12) having a plurality of optical fibers, said drum (8) being mounted in rotary manner on a shaft (6) mounted on the fixed support (2), said main optical cable (12) having an end (12b) fixed to the winding zone of said rotary drum, an optical compensating cable (14) spirally wound within drum (8) and having an end fixed to said drum (8) and connected to the end (12b) of the main optical cable (12) and an end mounted on a fixed part (18) of the support.

8 Claims, 4 Drawing Sheets

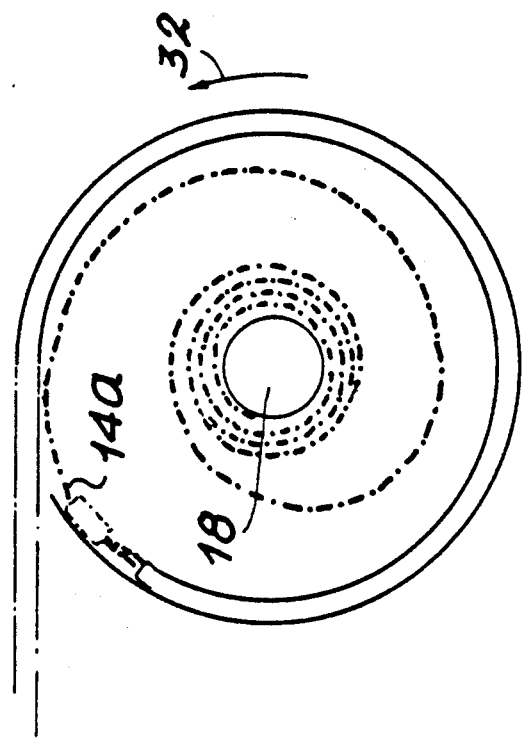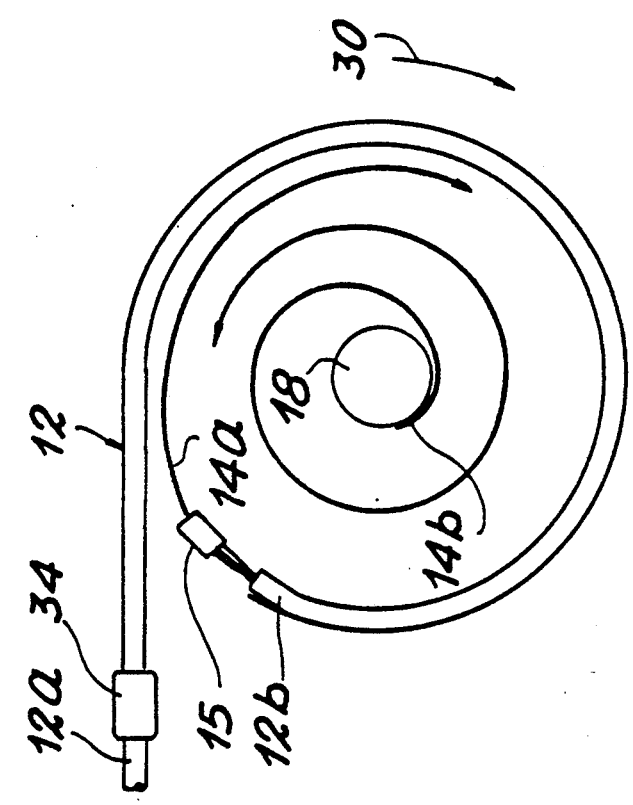

WINDER-UNWINDER FOR OPTICAL FIBRE CABLES

This application is a continuation of application Ser. No. 352855, filed 5/16/89 now abandon.

DESCRIPTION

Winders are means making it possible to establish a cable link between a fixed station and a moving station in displacement. The winder supplies the necessary cable length in proportion to the moving away of the winder. Conversely, when the moving station moves closer, the winder absorbs the excess cable.

Winders-unwinders for electric cables are already known. In a first category, said means have rotary electric contacts constituted e.g. by brushes moving on circular copper tracks. These winders have the advantage of not limiting the rotation of the drum on which the cable is wound. However, a winder of this type cannot be used for a cable constituted by optical fibers.

Multiple winding means are also known. The simplest of these, called "double winding" means have two adjacent cable windings in opposite directions. They suffer from the disadvantage of not being joinable either to the fixed station or to the moving station and must consequently be guided in such a way as to permit the displacement thereof, which is often equal to half the travel of the moving station.

More complex multiple winding systems are also known, which obviate the above disadvantages. However, they are heavier and more cumbersome and are difficult to transport in the case of an optical fiber cable for which limiting curvature specifications must be carefully respected.

In the field of optical fiber cables, a rotary optical fiber connector is known in which two ends of an optical fiber are arranged in the extension of one another, one of the fibers rotating and the other being fixed. However, this solution is only applicable to a single optical fiber and cannot be used for a multichannel optical fiber cable, i.e. having several fibers.

The present invention relates to a winder-unwinder for an optical fiber cable obviating the disadvantages referred to hereinbefore.

This winder more particularly applies to the telemanipulation and robotics fields. It can be used for equipping load transfer means, such as industrial cranes or mobile overhead cranes. It more particularly applies when the analog or logical data have to be transmitted with a low error rate and with a complete immunity from electromagnetic disturbances and interference.

More specifically, the present invention relates to a winder-unwinder for optical fiber cables, characterized in that it comprises a support, a drum having a winding zone for an optical fiber cable with a plurality of optical fibers, said drum being mounted in rotary manner on a shaft mounted on the fixed support, the main optical cable having an end fixed to the winding zone of said rotary drum, an optical compensation cable spirally wound within the drum and having one end fixed to said drum and connected to the end of the main optical cable and one end mounted on a fixed part of the support.

Preferably, it comprises a spirally wound return spring having one end integral with a fixed part of the support and one end mounted in fixed manner on said rotary drum.

The invention is described in greater detail hereinafter relative to non-limitative embodiments and the attached drawings, wherein;

FIGS. 4a and 4b show diagrammatically the winder-unwinder when the main cable is in the wound position (FIG. 4a) and in the unwound position (FIG. 4b), respectively.

Figure 1:
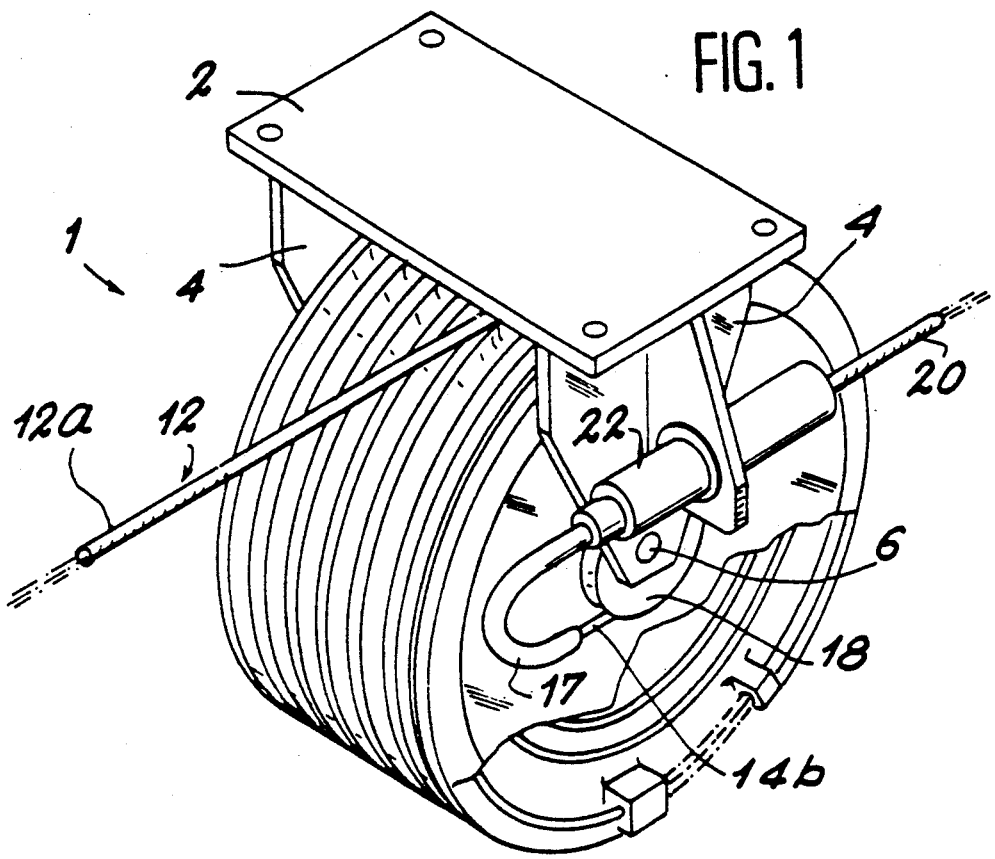
FIG. 1 is a perspective view of a winder-unwinder according to the invention.
Figure 2:
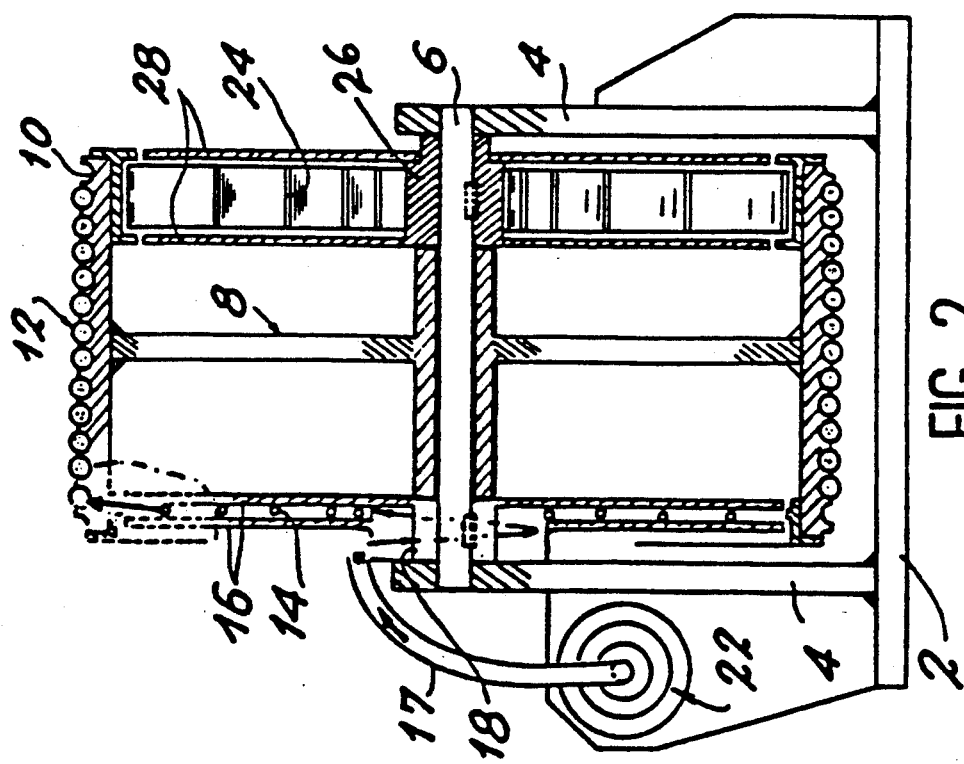
FIG. 2 is a sectional view along a plane passing through the rotation shaft of the winder-unwinder drum shown in FIG. 1.

FIG. 1 shows in perspective view a winder-unwinder according to the invention. It is constituted by a fixed support 2 having e.g. four fixing holes making it possible to connect it by screws to a fixed station or a moving station. Support 2 is provided with two end covers 4 supporting a rotation shaft 6 on which is mounted in rotary manner a drum 8. The latter has a helical groove in which is located the main optical fibre cable 12. As can be seen in FIG. 2 and more particularly in FIG. 3, an optical fiber cable 14, called a compensating cable, is located within the drum 12. It is preferably held between two flanges 16. It has an end 14b integral with a fixed cylindrical core 18. Preferably, end 14b of the compensating cable 14 is helically wound by a few turns or coils, e.g. two or three, onto the fixed cylindrical core 18, so as to create a lateral displacement of end 14b of cable 14 with respect to the outer flange 16. The effect of this lateral displacement is to facilitate the moving out of the fixed end of the compensating cable 14 and its connection to another optical cable having a structure which is e.g. identical to that of the main optical fiber cable 12. As a non-limitative example, end 20 can be connected to end 14b of compensating cable 14 by means of a multichannel connector 22 mounted on support 2. A rigid guide 17 protects the optical fiber cable 14.

Figure 3:
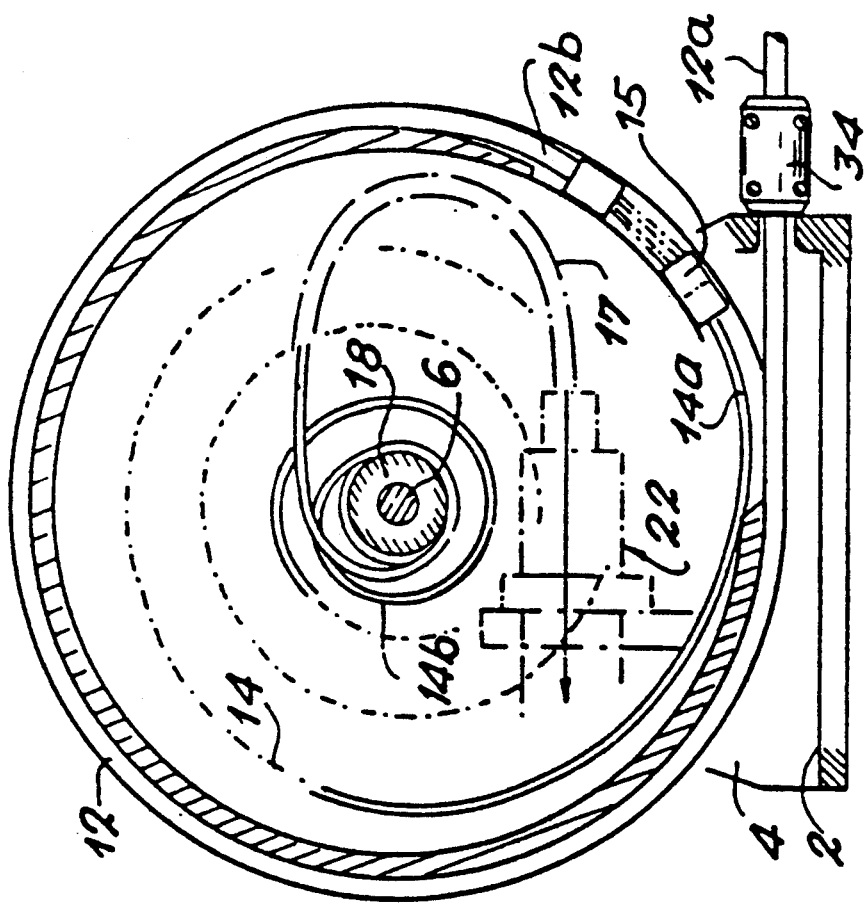
FIG. 3 is a diagrammatic view of the winder of FIGS. 1 and 2 more particularly showing the arrangement of the optical fiber compensating cable.

At its other end 14a, the optical compensating cable 14 is fixed to the peripheral wall of drum 8. As can be seen in FIG. 3, drum 8 has an opening permitting the connection of the compensating cable end 14a to the end 12b of the main optical fiber cable 12 by means of a connection box 15. Thus, the compensating cable is wound within the drum, whereas the main cable is wound outside said drum.

The winder-unwinder also has a spiral spring 24 within the drum. The spiral spring has an inner end fixed to a hub 26, which is itself fixed with respect to frame 2 and an outer end rendered integral with the drum 8. Preferably, the spiral spring 24 is guided on either side by two flanges 28.

As can be seen in FIG. 1, a certain cable length can be wound onto drum 8. For example, if the drum groove has six lengths, it is possible to wind onto drum 8 a cable length corresponding to six times the mean circumference of the drum. The corresponding winding direction of cable 12 onto the drum is designated by arrow 30 in FIG. 4a. When the main optical cable 12 is wound in this way by rotating the drum in the direction of arrow 30, the end 14a of the optical compensating cable performs a corresponding number of turns, so that the compensating cable 14 wound onto core 18 is slackened.

Conversely, on unwinding the main optical fiber cable 12 by rotating drum 8 in the direction designated by arrow 32 in FIG. 4b, the end 14a of the compensating cable fixed to the drum performs a corresponding number of rotations in the direction of arrow 32, so that the coils of the optical fiber compensating cable 14 tighten on core 18, as shown in FIG. 4b.

Thus, when the main cable 12 is in the wound position, the coils of the compensating cable are slackened. However, when the main optical fiber cable 12 is in the unwound position, the coils of the compensating cable 14 are more numerous and tighter.

It can also be seen that the spiral return spring has a behavior similar to that of the compensating cable 14. When the main cable 12 is in the wound position, the coils of spring 24 are slackened. The tensile stress on the main cable is then at a minimum. However, when the main optical fiber cable is in the unwound position, the coils of spring 24 are tightened and the tensile stress on the main cable is at a maximum. FIGS. 3 and 4a also show the fixed abutment 34 mounted on the main cable, which defines the maximum winding position of the main cable by preventing the drum from continuing its rotation until the complete slackening or relief of the spiral spring 24.

It can also be seen that the spiral return spring 24 can be replaced by a controlled geared motor, a crank or any other known means.

If it is wished to use the winder-unwinder over N rotations of the drum and if it is assumed that D and d are respectively the maximum and minimum spiral winding diameters of the optical compensating cable and that L is the compensating cable length corresponding to its spiral winding zone, the minimum number N of coils in the wound position of the main optical cable 12 is given by the formula:

$$N_e = \frac{L}{\pi \cdot D}$$

The number Nd of coils in the unwound position (FIG. 4b) will therefore be:

$$N_d = N_e + N$$

This imposes the following condition:

$(N_e+N)\cdot \pi d < L$, i.e.: $L(1-d/D) > N\pi \cdot d$.

The minimum value of d is imposed by the specification of the minimum radius of curvature acceptable by the compensating cable. The most favorable cable structure from this standpoint is that of a cable obtained by direct bonding with bare fibers. The minimum radius of curvature for such a cable, although greater than that of a single optical fiber, remains of the same order of magnitude.

The other characteristics required of this cable are that it has an adequate rigidity to prevent any excessive sagging of the coil and a very limited roughness in order to facilitate the sliding of the coils.

Figure 5:
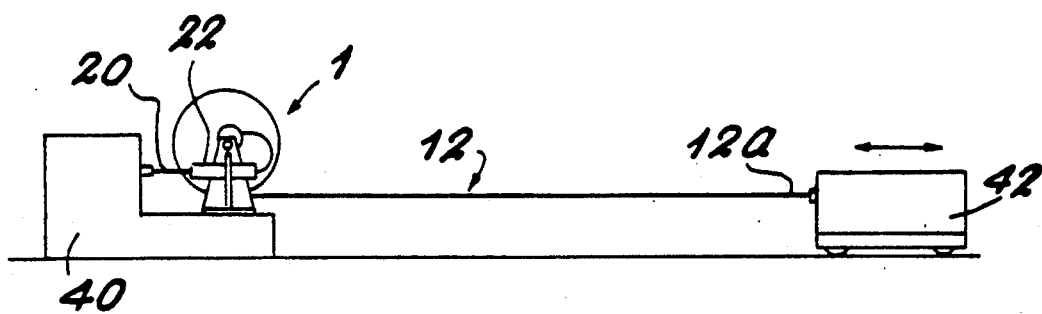
FIG. 5 is a smaller scale diagram showing the connection of a winder-unwinder according to the invention to a fixed station.

FIG. 5 shows a winder-unwinder according to the invention, designated by the reference 1 and mounted on a fixed station 40. In this case, it can be seen that the optical cable 20 connected to the multichannel connector 22 leads to the fixed station 40, whereas the free end 12a of the main cable 12 leads to a moving station 42.

Figure 6:
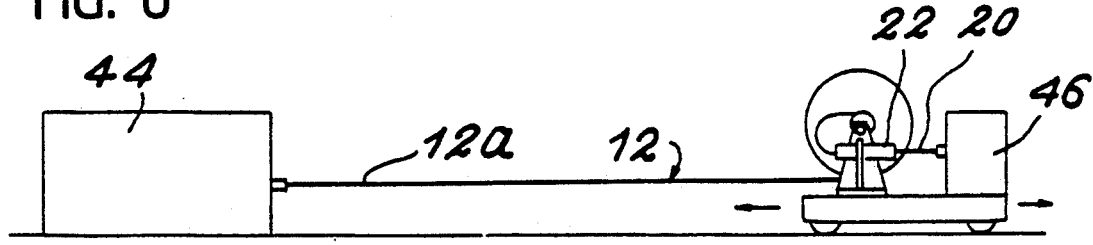
FIG. 6 is a diagram similar to that of FIG. 5, but showing the connection of the winder-unwinder to a moving station.

In FIG. 6, the free end 12a of cable 12 is connected to a fixed station 44, whereas the moving station 46 is connected to the multichannel connector by means of the optical cable 20.

Figure 7:
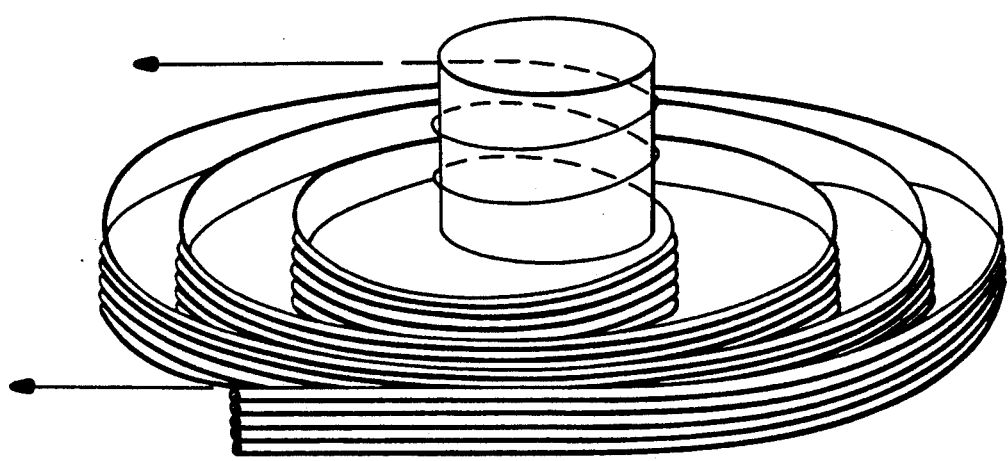
FIG. 7 is a perspective view of the flat compensation cable comprising a plurality of optical fibers.

FIG. 7 shows an embodiment of the compensation cable which is flat and comprises a plurality of optical fibers.

The apparatus described hereinbefore is applicable to remote intervention in the nuclear field, particularly in reprocessing plants and the associated research laboratories. The winder-unwinder according to the invention must be able to withstand nuclear radiation. It must be tight to surface water and have remotely manipulatable optical connections (multichannel connector 22), i.e. which can be fitted and dismantled remotely by means of a telemanipulator. Finally, it is pointed out that the intermediate connection, by means of a connecting box 15, between the end 12b of the main optical fiber cable 12 located on the drum and the end 14a of the compensating cable 14 is not indispensable. This connecting box can be eliminated if the same cable serves both as the main cable and as the compensating cable. This is only possible when the characteristics necessary for the compensation function (limited thickness, adequate rigidity) are not incompatible with those required by the main cable (mechanical strength and chemical inertia).

We claim:

1. A winder-unwinder for optical fiber cables, comprising a support (2), a drum (8) having a winding zone for an optical fiber cable (12) with a plurality of optical fibers, said drum (8) being mounted in rotary manner on a shaft mounted on the fixed support (2), the main optical cable (12) having an end (12b) fixed to the winding zone of said rotary drum, an optical compensation cable (14) spirally wound within the drum (8) and having one end fixed to said drum (8) and connected to the end (12b) of the main optical cable (12) and one end mounted on a fixed part (18) of the support, said optical compensation cable having a spirally wound first portion which is guided by first and second substantially parallel and relatively axially displaced radial walls supported by said support, having a second portion connected to said first portion which is wound around a fixed cylindrical core mounted on said shaft, and having a third portion which is connected to said support and to said second portion, wherein said first radial wall is connected to said core, said second radial wall has an aperture which forms a substantially annular gap with said core, said second portion of said optical compensation cable traverses said annular gap, the ends of said second portion of said optical compensation cable are relatively axially displaced, and said optical fiber compensation, cable (14) is a constituted by a flat cable formed by several optical fibers which are in contact and joined to each other to form a row.

2. Winder-unwinder according to claim 1, characterized in that it has a spirally wound return spring (24) and an end (26) integral with a fixed part of the support and an end fixed to the rotary drum (8).

3. Winder-unwinder according to claim 1, characterized in that the optical fiber compensating cable (14) is mounted between two end plates (16).

4. Winder according to claim 1, characterized in that the main optical fiber cable (12) and the optical fiber compensating cable (14) are formed by the same cable, the compensation being provided by part of the main optical fiber cable spirally wound within the rotary drum (8).

5. Winder according to claim 1, characterized in that the flat cable (14) is constituted by bare optical fibers bonded in juxtaposed manner.

6. Winder according to claim 1, characterized in that the optical fiber compensating cable (14) has, on the side of its end mounted on the support, a zone helically wound onto a fixed cylinder forming part of the support, so as to create a lateral displacement of the end of the compensating cable facilitating its moving out without any mechanical stressing.

7. Winder according to claim 1, characterized in that it has a multichannel connector (22) mounted on support (2) for connecting the end of the optical compensating cable (14) mounted on said support to another optical fiber cable (20).

8. Winder according to claim 1, characterized in that the connection between the end of the main optical fiber cable (12b) fixed to the rotary drum (8) and the end (14a) of the optical fiber compensating cable (14) mounted on said drum is brought about by means of a connecting box (15).

* * * * *